H. B. ROSS.
DRINK MIXING MACHINE.
APPLICATION FILED AUG. 3, 1920.
1,399,080.
Patented Dec. 6, 1921.
3 SHEETS—SHEET 1.
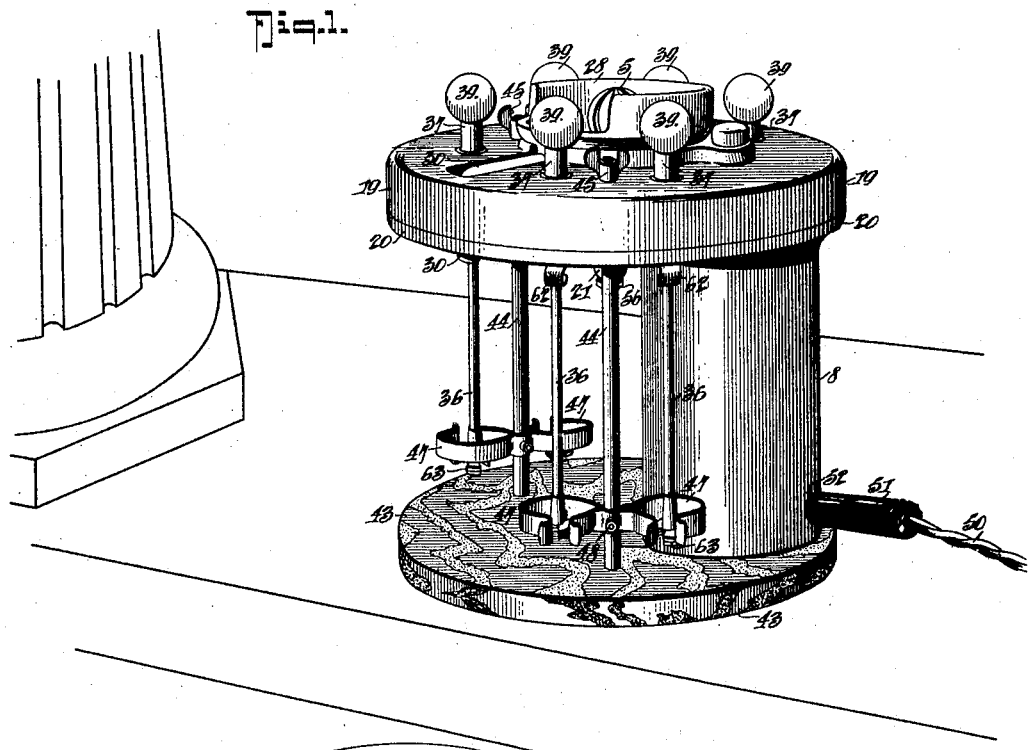
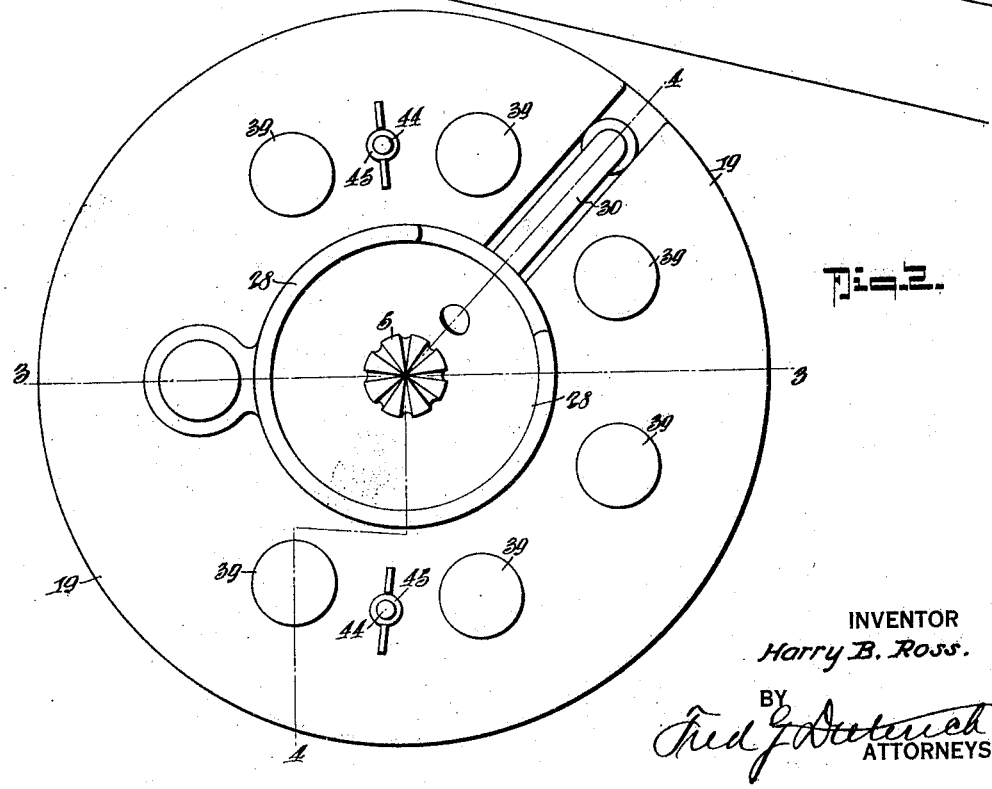
INVENTOR
Harry B. Ross.
BY
ATTORNEYS H. B. ROSS.
DRINK MIXING MACHINE.
APPLICATION FILED AUG. 3, 1920.
1,399,080.
Patented Dec. 6, 1921.
3 SHEETS—SHEET 2.
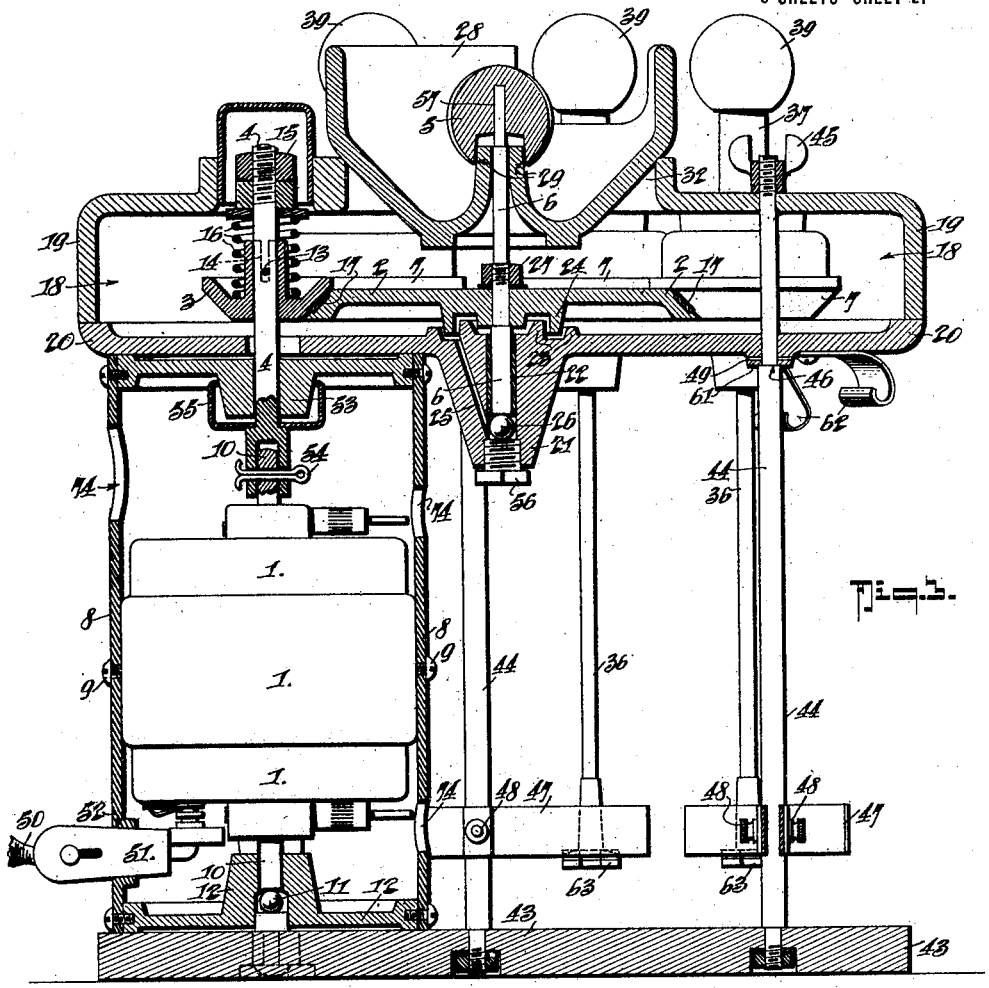
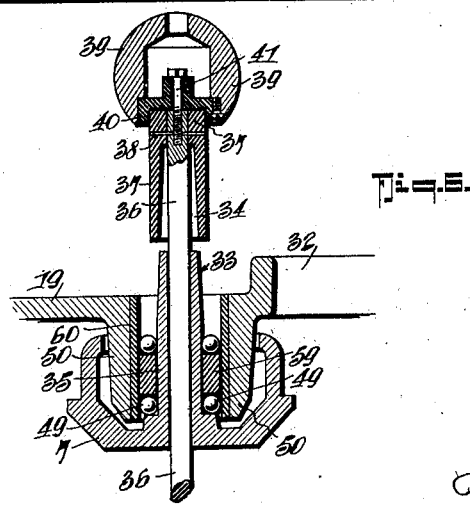
INVENTOR
Harry B. Ross.
BY
Fred G. Dieterich
ATTORNEYS

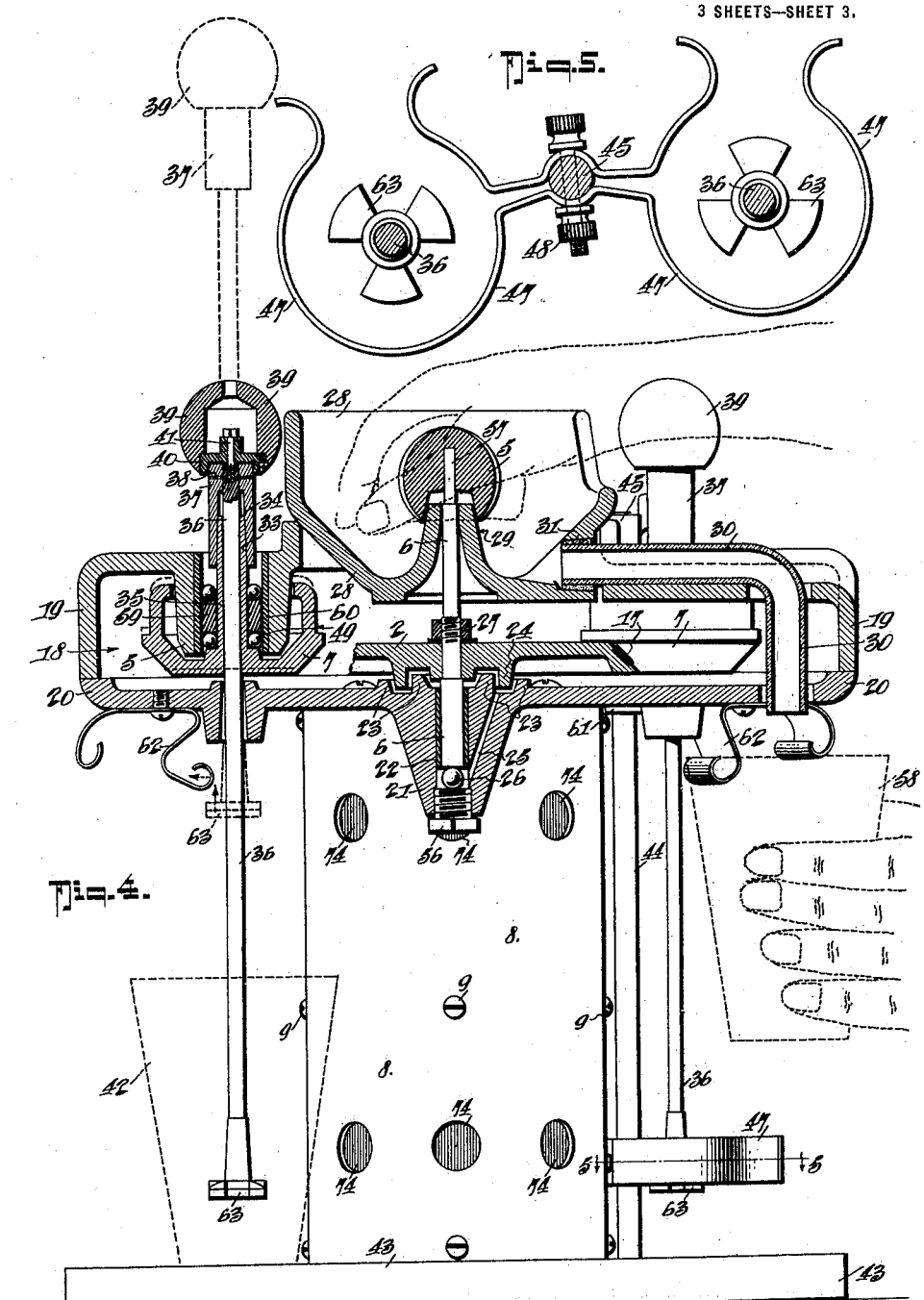

UNITED STATES PATENT OFFICE.

HARRY B. ROSS, OF DENVER, COLORADO, ASSIGNOR OF THREE-FOURTHS TO HAROLD A. CLARKE, OF DENVER, COLORADO.

DRINK-MIXING MACHINE.

1,399,080.  Specification of Letters Patent.  Patented Dec. 6, 1921.

Application filed August 3, 1920. Serial No. 400,902.

*To all whom it may concern:*

Be it known that I, HARRY B. ROSS, a citizen of the United States, residing at Denver, county of Denver, and State of Colorado, have invented certain new and useful Improvements in Drink-Mixing Machines, of which the following is a specification.

This invention has for an object to provide a mixer which is especially useful as a soda or other drink mixer or emulsifier, and it particularly has for its object to provide such a device which will eliminate the objectionable features of those devices at present in general use, which involve raising and lowering the motor proper and making and breaking electric contacts to start and stop the motor.

Another object is to provide a device with a multiplicity of agitators driven either separately or collectively by a single stationary motor, with provision for rendering the agitator spindle inoperative at the will of the user.

A further object is to provide the agitator with a juice extractor device driven from the same motor that drives the agitator spindles and capable of operation simultaneously with any or all of the agitator spindles or capable of operation independently thereof, the juice extractor being designed so it may be bodily removed, with the juice collecting cup, from the apparatus for cleaning or other purposes.

Again it is an object of the invention to provide an apparatus in which the motor is mounted in a suitable protecting housing with provision whereby it may be readily uncoupled from the driving shaft of the mechanism when it is desired to disassemble the mixer drive mechanism, etc., for inspection or repairs, etc.

The invention also involves those novel features of construction, combination and arrangement of parts, all of which will be first fully described, then be specifically pointed out in the appended claims and illustrated in the accompanying drawings, in which:

Figure 1 is a perspective view of the invention.

Fig. 2 is a top plan view of the same.

Fig. 3 is a vertical section on the line 3—3 of Fig. 2.

Fig. 4 is a vertical section on the line 4—4 of Fig. 2.

Fig. 5 is a detail horizontal section on the line 5—5 of Fig. 4, showing the clamps to hold the glasses.

Fig. 6 is an enlarged detail sectional view of the knob connections with the spindle clutch for one of the mixer spindles.

In the drawings, in which like numerals and letters of reference indicate like parts in all of the figures, 1 represents the motor which is inclosed and supported in a cylindrical cage 8 by screws 9 and rests with the motor armature shaft 10 seated on the single ball 11 in the motor cage support 12. The upper motor cage support is drilled to form a bearing 53 for the driving shaft 4, a pin 54 joining the driving shaft 4 to the motor armature shaft 10. The driving shaft 4 has a pin 13 to fit into a slot 14 in the sleeve of the driving cone 3, thereby keying the driving cone 3 to the shaft 4 so that it can slide up and down. The driving cone 3 is held in frictional engagement with the master cone or friction gear 2, which gear 2 has a double function, namely,—that of driving the agitator spindles through beveled disks 7 and driving the juice extractor ribbed ball 5 on the shaft 6.

By adjusting the nut 15, the spring 16 which holds the cone 3 shown in frictional engagement with the master friction gear 2 can be tightened to increase the pressure on the frictional surfaces of the cones 2 and 3. 55 designates an oil cup for sustaining a certain level of oil in the bearing 53 for the shaft 4.

The master cone disk or friction gear 2 has a rubber band or other suitable frictional band fitted annularly in its beveled outer rims, as indicated at 17. This band contacts with the outer rim of all of the spindle agitator driving cones 7 and the driving shaft cones 3, the master cone 2 being driven by the driving cone 3 and in turn drives the spindle operating cones 7.

The driving cones 3, the master cone 2 and the spindle cones 7 are all incased in the housing 18 which is formed by the upper segment 19 and the lower segment 20. The lower segment 20 is provided with a boss 21 at its center, which is fitted with a bushing 22 to form a bearing for the shaft 6. Annular ridges 23 on the lower section of the housing form an oil trap in coöperation with the annular ridge 24 of the master cone 2, a hole 25 being drilled in the boss 21 to allow the return of oil to the ball thrust bearing 26; a plug 56 supporting the bearing 26 in the boss 21. 27 is a nut which is tightened on the threaded part of the shaft 6 and fastens the master cone disk 2 to the shaft 6.

The upper end of the shaft 6 is square in cross section at 57 and has a sliding fit in the squared socket of the ribbed-ball 5 so that the shaft and ball rotate together. 28 is the juice bowl which is so mounted in an opening 32 of the upper segment 19 of the housing that it fits over the upper end of the shaft 6, it having a center teat, the upper outer end of which is tapered at 29 to fit the tapered socket of the ball 5 as the juice bowl is lifted off its support in removing it from the apparatus. The juice bowl 28 may be made of glass or aluminum or of any other suitable material, and is so constructed as to surround the revolving juice extracting ball 5, thus preventing splashing of the juice. By holding half of an orange or lemon down on the ball 5 while it is revolving the extracted juice will fall into the juice bowl 28 from which it runs out through a tube 30 of any suitable material (glass or aluminum) inserted and corked at 31 into a discharge aperture of the juice bowl 28 by which tube 30 the juice is conveyed into a glass 58 held in the hand.

The spindle agitators 36 (of which there may be any number, six being shown) have their center one or ones circumferentially located around the shaft 6 and are driven, when desired, by male 33 and female 34 clutches, the male clutch 33 being the tapered end of hollow axles 35 of the driving cones 7.

49 is a bearing consisting of two ball races and spacer collar 59 and steel hardened bushing 60 inserted in the boss 50 of the upper segment 19 of the housing. The female clutch 34 is the sleeve 37 which is pinned to the agitator spindle 36 at 38. The handle ball 39 is fastened to the bushing 40 to rotate free of the spindle agitator 36 on a screw pivot 41. When it is desired to stop the agitator spindle and remove the glass 42, the handle ball 39 is lifted to the dotted line position shown in Fig. 4, which causes the male and female clutches 33—34 to become disengaged, leaving the driven cone 7 of that unit free to rotate without effecting the particular agitator spindle 36.

The faces of frictional contact of the cones 7, 2 and 3 are beveled to take up wear in the friction band 17 by gravity.

43 designates a base of marble or any other suitable material on which the supporting columns 44 for the top of the machine are mounted. The columns 44 are provided with wing nuts 45 to clamp the upper and lower segments 19—20 of the housing 18 together, the housing being made of aluminum or other suitable material. The housing is provided with bosses 61 which are slotted to receive the pin 49, the support 44 having a shoulder 46 to engage the boss 61 as shown in Fig. 3 of the drawings.

Clamps 47 are provided to hold glasses or other vessels which rest on the base 43, the clamps being fastened to the supports 44 by bolts with knurled nuts 48.

50 designates the terminal wires of the source of electric energy which have a connector 51, of the usual plug form or plug and switch combined, the connector 51 being insertible through an aperture 52 in the motor housing 8.

62 designates spring clamps whose function is to engage with the agitator disk 63 when the agitator spindle 36 is drawn up (see dotted lines Fig. 4) and hold the spindle in the elevated or inoperative position.

The motor housing is provided with suitably located openings 74 for the insertion of suitable tools to get at the parts of the motor for adjustment when desired.

From the foregoing description taken in connection with the accompanying drawings, it is thought the complete construction, operation and advantages of my invention will be clear to those skilled in the art. It will be observed, however, that by the use of my apparatus I have provided a compact, simple inexpensive structure with adequate protection for the motor and driving gear with a view to sanitation and the structure is such that the parts may be easily disassembled and put together again for the purpose of cleaning, oiling, or repairing and while the drawings illustrate a preferred embodiment of the invention I do not wish to limit myself to the precise details of construction shown and described as changes in the details of construction may be made without departing from the spirit of the invention or the scope of the appended claims.

In this application while I have shown the juice extractor I desire it understood that I do not claim the same, *per se*, since that constitutes the subject matter of a divisional application filed on the 13 day of June, 1921, Serial #477190.

What I claim is:

1. In a soda mixing mechanism, a base, a housing, supporting columns on the base for the housing, a motor housing located on the base between the base and the first mentioned housing, an electric motor in said motor housing, a driving shaft coupled with the shaft of the motor and projecting into the first mentioned housing, a master friction drive cone mounted in said housing, a driving cone mounted on said driving shaft within the housing to engage the master cone, at least one spindle bearing carried by the housing, a friction drive cone having a hollow axle journaled in said bearing, an agitator spindle longitudinally movable in said hollow axle, a clutch device between said spindle and hollow axle for engaging the same when said agitator spindle is down, means for holding said driving shaft cone in frictional engagement with said master cone, substantially as shown and described.

2. In a soda mixing mechanism, a base, a housing supported over the base, an incased motor located on the base beneath the housing, a driving shaft coupled with the shaft of the motor and projecting into the housing, a master friction drive cone mounted in the housing, a driving cone mounted on said driving shaft within the housing to engage the master cone, at least one spindle bearing carried by the housing, a friction drive cone having a hollow axle journaled in said bearing, an agitator spindle longitudinally mounted in said hollow axle, a clutch device between said spindle and hollow axle for engaging the same when said agitator spindle is down, means for holding said driving shaft cone in frictional engagement with said master cone, said means comprising a tension spring and lock nut device coöperative with said driving shaft cone, substantially as shown and described.

3. In a soda mixing mechanism, a base, a motor mounted on said base, a driving shaft connected with the motor, a friction cone drive element on said driving shaft, a centrally located master friction cone driven by said drive element, a series of friction cones at the periphery of said master cone and driven by said master cone, an axially located agitator spindle for each of said series of friction cones and axially movable in the same and friction clutch elements for connecting said spindles with their respective friction cones substantially as shown and for the purposes described.

4. In a soda mixing mechanism, a base, a motor mounted on said base, a driving shaft connected with the motor, a friction cone drive element on said driving shaft, a centrally located master friction cone driven by said drive element, a series of friction cones at the periphery of said master cone and driven by said master cone, an axially located agitator spindle for each of said series of friction cones and axially movable in the same, friction clutch elements for connecting said spindles with their respective friction cones, and means for holding said spindles raised in the inoperative position.

5. In a soda mixing mechanism wherein is provided a driving motor, an agitator spindle and friction driving elements between said motor and said spindle; said friction driving elements comprising disk-like bodies having beveled peripheries to automatically adjust the frictional contact by gravity.

6. In a soda miving mechanism, a centrally located large friction disk driven by an electric motor's small friction disk, the large friction disk having an axle shaft fixed to rotate with it and slidably keyed to a juice extractor ball segment, said large disk engaging a series of friction disks having agitator spindles with provisions for frictionally clutching or de-clutching the spindles to their respective friction disks for the purpose of simultaneous agitating fluids and juice extracting without stopping the electric motor.

7. In an apparatus of the class described, a base, a housing supported above the base, a drive motor and housing located between the base and the first mentioned housing, said first mentioned housing constituting a gear box, a central spindle journaled in a bearing in said gear box, a series of agitator spindles carried by said gear box, driving connections between said motor and the several spindles, clutch elements connecting the agitator spindles with their respective driving elements in combination with a juice receiving bowl and a juice extractor driven by said central spindle.

8. In apparatus of the class described, the combination with a series of fluid mixing agitators, of a juice extractor and a single motor for driving said agitators and extractor.

9. In apparatus of the class described, the combination with a fixedly located driving motor and a juice extractor having a shaft continuously driven by said motor; of a series of agitator spindles also driven by said motor simultaneously with the juice extractor and including clutching elements for the independent operation of said agitator spindles whereby one or more of the agitator spindles may be operated simultaneously with the operation of the juice extractor.

10. In apparatus of the class described, a motor, a central master disk axially located and frictionally driven from said motor, a juice extractor driven by said master disk, radially located fluid agitator spindles with friction driving elements connecting them with said master disk and friction clutches for connecting said agitator spindles with their respective friction drives, substantially as shown and described.

11. In apparatus of the class described, a base, a gear box and standards supporting said gear box above the base, a central spindle journaled in a bearing in said gear box, a driving shaft carried by said gear box and at least one agitator spindle carried by said gear box, gearing between said driving shaft and the respective spindles, a juice extractor driven by said central spindle and an electrical motor removably connected with said drive shaft and capable of being bodily removed from the remaining parts of the apparatus while maintaining its connection with a source of electric energy.

12. In apparatus of the class described, a base, a gear box supported on standards above said base and a motor cage located between the base and gear box and forming an additional support for the gear box.

13. In apparatus of the class described, a gear box consisting of an upper and a lower housing segment, the lower housing segment having a boss provided with a spindle bearing, a spindle journaled in said bearing, a ball thrust bearing located in said boss on which said spindle rests, a pair of spaced annular ridges on said lower segment surrounding said spindle to form oil traps, the center one of which communicates with the spindle bearing, said boss having an oil passage between the outer oil trap and the ball thrust bearing, a gear member on said spindle having an annular ridge coöperating with said annular ridges of said lower housing member to form an oil trap substantially as shown and described.

14. In apparatus of the class described, a gear box consisting of an upper and a lower housing segment, the lower housing segment having a boss provided with a spindle bearing, a spindle journaled in said bearing, a ball thrust bearing located in said boss on which said spindle rests, a pair of spaced annular ridges on said lower segment surrounding said spindle to form oil traps, the center one of which communicates with the spindle bearing, said boss having an oil passage between the outer oil trap and the ball thrust bearing, a gear member on said spindle having an annular ridge coöperating with said annular ridges of said lower housing member to form an oil trap, a motor housing mounted between the base and gear box, a driving shaft bearing carried by said motor housing and projecting into the gear box, said gear box having an aperture whereby lubricant may gravitate to said driving shaft bearing from the interior of the gear box substantially as shown and described.

15. In apparatus of the class described, a master friction cone gear journaled on a spindle, a motor operated driving shaft, a driving cone slidable on said driving shaft and keyed to turn with the same and a spring for pressing said driving cone in engagement with said master cone, substantially as shown and described.

16. In apparatus of the class described wherein is provided a driving motor, an agitator spindle and friction driving elements between the same, said elements including a spindle cone having a hollow sleeve and bearing elements in which said sleeve is journaled, said agitator being longitudinally movable in said hollow sleeve, said hollow sleeve constituting a male clutching element, a female clutching element on the agitator coöperating with said male clutching element to connect the same when the agitator is lowered, substantially as shown and described.

17. In apparatus of the class described wherein is provided a driving motor, an agitator spindle and friction driving element between the same; said elements including a spindle cone having a hollow sleeve and bearing elements in which said sleeve is journaled, said agitator being longitudinally movable in said hollow sleeve, said hollow sleeve constituting a male clutching element, a female clutching element on the agitator coöperating with said male clutching element to connect the same when the agitator is lowered, and means for holding the agitator spindle elevated to hold the male and female clutching elements disconnected.

18. In apparatus of the class described, a gear box having a bearing boss, a driven element including a hollow sleeve journaled in bearings in said bearing boss and having an outer wall to embrace said bearing boss thereby inclosing an oil chamber to maintain oil at a definite level in said bearing, an agitator spindle journaled in said hollow sleeve and adapted to be clutched with the same when the agitator spindle is lowered substantially as shown and for the purposes described.

HARRY B. ROSS.